Sept. 19, 1961 H. B. BARRETT 3,000,431
MACHINES FOR STRIPPING LINING FROM AUTOMOTIVE BRAKE SHOES
Filed March 8, 1957 6 Sheets-Sheet 1

INVENTOR
HARRY B. BARRETT
BY *Alfred W. Petchaft*
ATTORNEY

Sept. 19, 1961 H. B. BARRETT 3,000,431
MACHINES FOR STRIPPING LINING FROM AUTOMOTIVE BRAKE SHOES
Filed March 8, 1957 6 Sheets-Sheet 2

INVENTOR
HARRY B. BARRETT

BY Alfred W. Petchaft

ATTORNEY

Sept. 19, 1961　　　　H. B. BARRETT　　　　3,000,431
MACHINES FOR STRIPPING LINING FROM AUTOMOTIVE BRAKE SHOES
Filed March 8, 1957　　　　　　　　　　　　　6 Sheets-Sheet 3

INVENTOR
HARRY B. BARRETT
BY *Alfred W. Petcheft*
ATTORNEY

Sept. 19, 1961     H. B. BARRETT     3,000,431
MACHINES FOR STRIPPING LINING FROM AUTOMOTIVE BRAKE SHOES
Filed March 8, 1957     6 Sheets-Sheet 4

INVENTOR
HARRY B. BARRETT

BY Alfred V. Petchaft

ATTORNEY

INVENTOR
HARRY B. BARRETT
BY *Alfred W. Petchaft*
ATTORNEY

Sept. 19, 1961 H. B. BARRETT 3,000,431
MACHINES FOR STRIPPING LINING FROM AUTOMOTIVE BRAKE SHOES
Filed March 8, 1957 6 Sheets-Sheet 6

INVENTOR
HARRY B. BARRETT
BY Alfred W. Petchaft
ATTORNEY 3,000,431
MACHINES FOR STRIPPING LINING FROM AUTOMOTIVE BRAKE SHOES
Harry B. Barrett, Clayton, Mo.
(18 S. Kingshighway, St. Louis 8, Mo.)
Filed Mar. 8, 1957, Ser. No. 644,860
5 Claims. (Cl. 154—1)

This invention relates in general to certain new and useful improvements in automotive brake relining equipment and, more particularly, to a machine for stripping worn lining from automotive brake shoes preparatory to relining.

Brake lining material is generally bonded to automotive brake shoes by means of a thermosetting adhesive and in some cases rivets are added as a safety measure. When the lining is worn and in need of replacement, it is necessary to remove the worn lining and prepare the brake shoe for relining. In the case of bonded shoes, the lining at the present time is removed by heating the shoe to a high enough temperature to decompose the bonding adhesive. As an alternative, the lining is chiseled off with suitable hand tools or similar mechanical means. Such procedures, however, tend to warp the shoe or chip up the surface thereof and otherwise cause damage which impairs or even destroys the further usefulness of the shoe.

It is, therefore, a primary object of the present invention to provide means for removing or stripping worn brake lining from a brake shoe in a simple, efficient, and rapid manner.

It is also an object of the present invention to provide a device of the type stated which can accommodate various sizes of brake shoes without the necessity of additional attachments, jigs, or the like.

It is a further object of the present invention to provide a device of the type stated capable of stripping the lining from brake shoes which have become warped during use.

It is another object of the present invention to provide a device of the type stated which can be operated by ordinary mechanics without any special skill or training and wherein the lining can be removed without danger of damaging the brake shoe.

With the above and other objects in view, my invention resides in the novel features of form, construction, arrangement, and combination of parts presently described and pointed out in the claims.

In the accompanying drawings (six sheets)—

Figure 1:
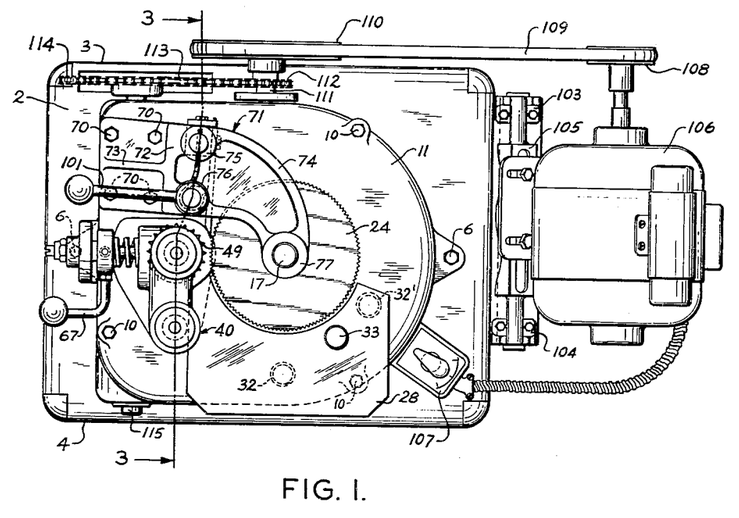
FIG. 1 is a top plan view of a brake shoe stripping machine constructed in accordance with and embodying the present invention.
Figure 2:
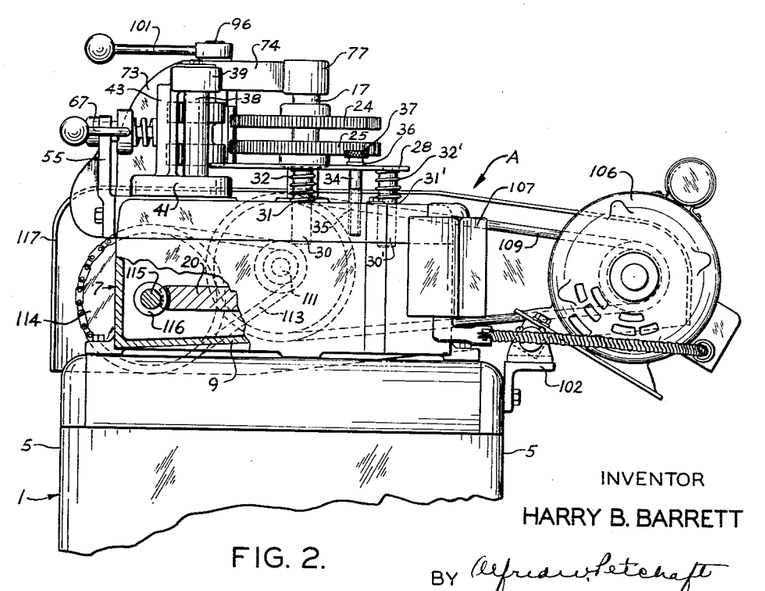
FIG. 2 is a fragmentary side elevational view of the machine shown in FIG. 1, partly broken away and in section.
Figure 3:
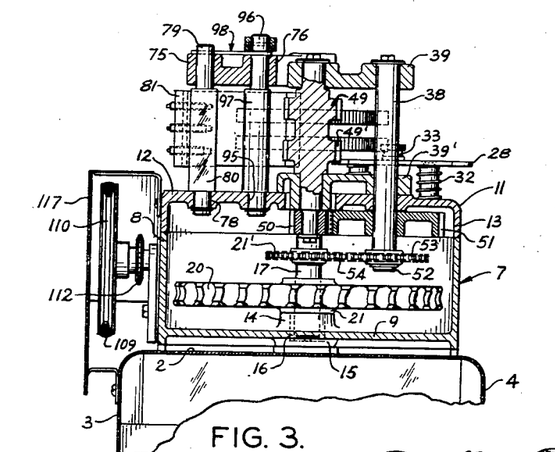
FIG. 3 is a fragmentary sectional view taken along line 3—3 of FIG. 1.

Referring now in more detail and by reference characters to the drawings, which illustrate practical embodiments of the present invention, A designates a brake shoe stripping machine comprising an upstanding, generally rectangular supporting table 1 having a top wall 2, a front wall 3, a rear wall 4, and side walls 5. Rigidly mounted upon the top wall 2 of the supporting table 1 by means of bolts 6 is a base housing 7 having a continuous somewhat arcuate vertical side wall 8 and a bottom wall 9. Secured closurewise across the top of the base housing 7 by means of bolts 10 is a cover casting 11 having a horizontal top wall 12 and a depending annular skirt 13 which matches the shape of the side wall 8 and rests endwise on top thereof. Formed centrally in the bottom wall 9 of the base housing 7 is a boss 14 having a depending pad 15 which rests directly upon the upper face of the top wall 2. The boss 14 is suitably bored and provided with a vertical step-bearing 16 for operatively receiving and supporting the lower end of a vertical shaft 17, which extends through a bearing 18 set in a boss 19 formed integrally in the cover casting 11. Rigidly secured upon the shaft 17 is a worm-wheel 20 provided with a hub 21 for endwise engagement with the upper face of the boss 14. Similarly mounted on the shaft 17 in upwardly spaced relation to the worm-wheel 20 is a driving sprocket 21', and also rigidly secured by set screws 22, 23, on the upper end of the shaft 17 and spaced above the top wall 12 is a pair of spaced parallel circular feed-wheels 24, 25, of equal diameter which, in turn, are respectively provided with peripheral serrations 26, 27.

Disposed between the horizontal wall 12 and the feed-wheel 24, and in spaced parallel relation to each, is a thin, flat brake shoe supporting plate 28 provided with an arcuate edge portion 29, the radius of which is slightly greater than the radius of the feed-wheels 24, 25. Integrally formed on the lower side of the plate 28 and projecting downwardly therefrom is a pair of spaced parallel pins 30, 30', which extend through holes 31, 31', bored in the horizontal wall 12. Encircling the pins 30, 30', are compression springs 32, 32', which bias the plate 28 upwardly with respect to the horizontal wall 12. An adjusting screw 33 which passes through the plate 28 is provided with a threaded shank portion 34 adapted to engage a tapped hole 35 in the horizontal wall 12. At its upper end the screw 33 is integrally provided with an annular collar 36 for bearing against the upper face of the plate 28 and a knurled knob 37 to facilitate manipulation of the screw 33, whereby the vertical distance between the plate 28 and the feed-wheels 24, 25, may be adjusted.

Figure 4:
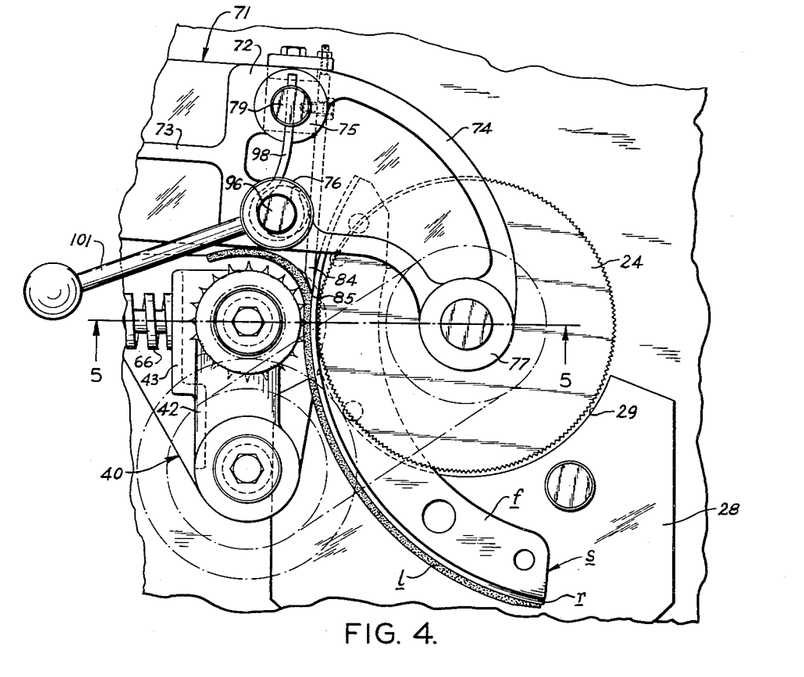
FIG. 4 is an enlarged fragmentary plan view of the machine shown in FIG. 1 showing the feeding and stripping mechanism.
Figure 5:
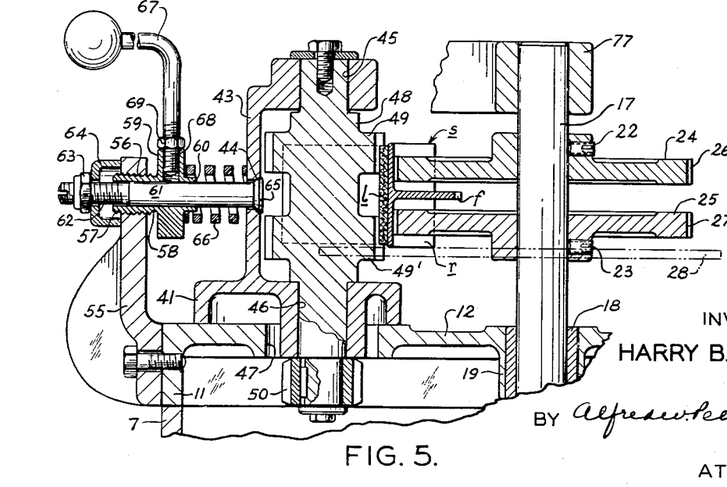
FIG. 5 is a fragmentary sectional view taken along line 5—5 of FIG. 4.

Rotatably mounted at its lower end in and projecting vertically upwardly from the horizontal top wall 12 is a pivot shaft 38 for operative engagement within vertically spaced bearing collars 39, 39', formed integrally upon and projecting laterally from a casting 40, which integrally includes a lower flange 41 and an upper flange 42 joined together by a vertical web 43, having a medial counter-bored aperture 44. The flanges 41, 42, are provided with a pair of vertically aligned bearings 45, 46 the latter being of such length in the vertical direction that it extends into a transverse clearance slot 47 in the horizontal top wall 12. Journaled at its ends in and extending between the bearings 45, 46, is a vertical spindle 48 integrally including two coarsely serrated feed-wheels 49, 49', which are located in peripheral alignment with the feed-wheels 24, 25. The spindle 48 extends downwardly through the slot 47 and is provided on such lower end with a spur gear 50 which meshes with another spur gear 51 keyed upon the lower end 52 of the pivot shaft 38 having a sprocket 53 drivingly connected by a roller chain 54 to the driving sprocket 21'.

Bolted upon the side face of the skirt 13 and projecting upwardly therefrom in laterally spaced alignment with respect to the web 43 is a bracket plate 55 provided at its upper end with an internally threaded aperture 56 for rotatably receiving the threaded end 57 of a tubular sleeve 58 which extends horizontally inwardly toward the web 43 and on its inner end is provided with a diametrally enlarged collar 59 and an inwardly projecting short, quill-like portion 60. Shiftably disposed in and extending axially through the sleeve 58 is a stud 61 having an outer threaded end 62 provided with a nut 63 and a skirted collar 64 which bears against the outer face of the bracket plate 55. At its inner end the stud 61 extends through the counterbored aperture 44 in the web 43 and is provided with a tapered head 65. Mounted loosely around the stud 61 in endwise abutment between the web 43 and the collar 59 is a heavy compression spring 66 which biases the casting 40 and the feed-wheels 49, 49', inwardly. An actuating lever 67 is threaded into a tapped radial hole 68 in the collar 59 and is secured in position by a lock-nut 69. It will be apparent that as the actuating lever 67 is moved so that the sleeve 58 moves toward the casting 40, the feed-wheels 49, 49', will be urged toward the feed wheels 24, 25, with greater force.

Rigidly secured to the top wall 12 by means of bolts 70 is a top casting 71 integrally including a vertical post portion 72, a reinforcing web 73, and an arcuate arm 74 having three vertical bearing bosses 75, 76, 77, the latter operatively engaging the upper end of the shaft 17. Journaled at its upper end in the bearing boss 75 and at its lower end in a bearing-forming aperture 78 in the top wall 12 is a knife-supporting spindle 79 integrally provided with a somewhat rectangular center portion 80 and an end plate 81. Rigidly secured to the center portion 80 in flat, facewise engagement therewith by means of bolts 82, 83, is a flat knife blade 84 provided with a cutting edge 85. As best seen by reference to FIG. 6, the bolts 82, 83, pass through slots 86, 87, in one end of the knife blade 84, and the end plate 81 is tapped for receiving a plurality of adjusting studs 88, 89, 90, secured by nuts 91, 92, 93, respectively, which studs bear against the end face 94 of the knife blade 84.

Figure 6:
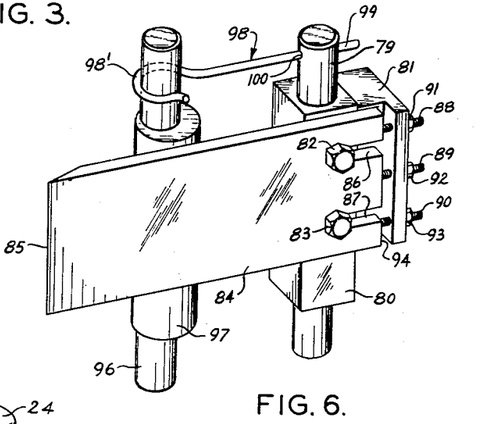
FIG. 6 is a fragmentary perspective view of the cutter knife assembly incorporated in the machine shown in FIGS. 1–5.

Journaled at its upper end in the bearing boss 76 and at its lower end in a bearing-forming aperture 95 in the top wall 12 is a shaft 96 provided with an eccentric cam portion 97 which is adapted to bear against and bias the knife blade 84 in the direction of the feed-wheels 24, 25. Joining the spindle 79 and the shaft 96 is a torsion spring 98 provided with a hook-like end portion 98' which encircles the upper end of the shaft 96 and a shank 99, the end of which passes through a hole 100 diametrally formed in the upper end of the knife-supporting spindle 79. An operating lever 101 is rigidly secured to the upper end of the shaft 96, whereby said shaft 96 may be rotated against the action of the torsion spring 98 and the eccentric cam portion 97 may move the cutting edge 85 in the direction of the feed-wheels 24, 25.

Figure 7:
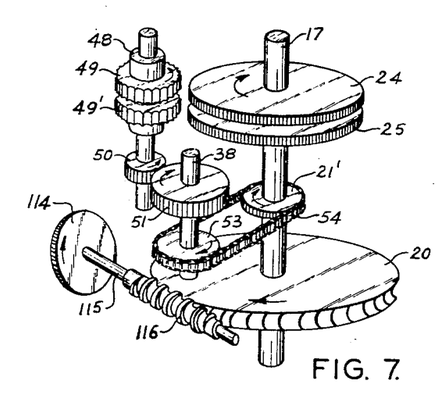
FIGS. 7 is a fragmentary perspective view showing the drive system for the machine shown in FIGS. 1–5.

Bolted to the top wall 2 of the supporting table 1 is a motor-supporting bracket 102 having secured thereto a pair of spaced trunnions 103, 104, for swingably supporting a motor mount 105 to which is bolted a conventional electric motor 106. The electric motor 106 is controlled by a conventional on-off switch and rheostat 107. Secured on the end of the motor shaft is a drive pulley 108 which transmits power through a V belt 109 to a drive pulley 110 mounted on a stub shaft 111. Also secured on the stub shaft 111 is a sprocket 112 which transmits power through a roller chain 113 to a large sprocket 114 which, in turn, drives a worm shaft 115 and worm 116, which drivingly meshes with the worm-wheel 20. By this means the shaft 17, the counter shaft 38, and the spindle 48 are rotated in the manner illustrated in FIG. 7. If desired, a belt guard 117 may be bolted to the front wall 3 of the supporting table 1 and the side wall 8 of the base housing 7.

In use, the position of the support plate 28 is adjusted by means of the adjusting screw 33 so that a brake shoe s having a flange f, a rim r, and a lining l may rest on the support plate 28 with the flange f positioned somewhat centrally between the feed-wheels 24, 25. The motor switch 107 is turned on and the brake shoe s is fed between feed-wheels 49, 49', which grip the lining l and the feed-wheels 24, 25, which grip the inside of the rim r, as shown in FIG. 4. During this operation the machine operator moves the operating lever 101 so that the cutting edge 85 of the knife blade 84 is positioned substantially tangent to the outer face of the rim r, whereby the lining l is stripped from the brake shoe s. It should be noted that if the serrations 26, 27, of feed-wheels 24, 25, and the serrations of feed-wheels 49, 49', do not adequately grip the brake shoe s, the adjusting sleeve 58 may be moved by the actuating lever 67 to thereby force the feed-wheels 24, 25, 49, 49', into gripforming engagement with the brake shoe s. It should also be noted that the cutting edge 85 of the knife blade 84 bears along a single straight line of contact and the feed-wheels 24, 25, 49, 49', are precisely parallel thereto. Therefore, a brake shoe, the rim of which may have become warped or out of round during service, can be stripped of its lining with little or no removal of the metal from the face of the shoe. Finally, the cutting edge 85 does not tend to "dig in" to the metal of the shoe but will tend to maintain a uniform "depth of cut," so to speak.

It is also possible to provide a modified form of brake shoe stripping machine shown in FIGS. 8–15, wherein A' designates a brake shoe stripper comprising a cast base housing 201 having a somewhat arcuate vertical side wall 202 and a substantially horizontal bottom wall 203 provided with a slightly inclined portion 204. Secured closurewise across the top of the base housing 201 by means of bolts 205 is a cover casting 206 having a horizontal top wall 207 and a depending annular skirt 208 which matches the shape of the side wall 202 and rests endwise on top thereof. Formed somewhat centrally of the bottom wall 203 is an upstanding boss 209, suitably bored and provided with a single freely floating ball bearing 210 for receiving and supporting the lower end of a vertical shaft 211, which extends through a bearing 212 formed integrally in the top wall 207 of the cover casting 206. Rigidly secured upon the shaft 211 by a key 213 is a worm-wheel 214 provided with a hub 215 for endwise engagement with the upper face of the boss 209. Similarly mounted on the shaft 211 upwardly of and abutting the worm-wheel 214 is a spur gear 216, and also rigidly secured by set screws 217, 218, and key 219 to a diametrically reduced upper end portion 220 of the shaft 211 and spaced above the top wall 207 is a pair of spaced parallel circular feed-wheels 221, 222, of equal diameter. The feed-wheels 221, 222, are similar to the feed-wheels 24, 25, and are provided with peripheral serrations or knurls 223, 224.

Figures 8, 11:
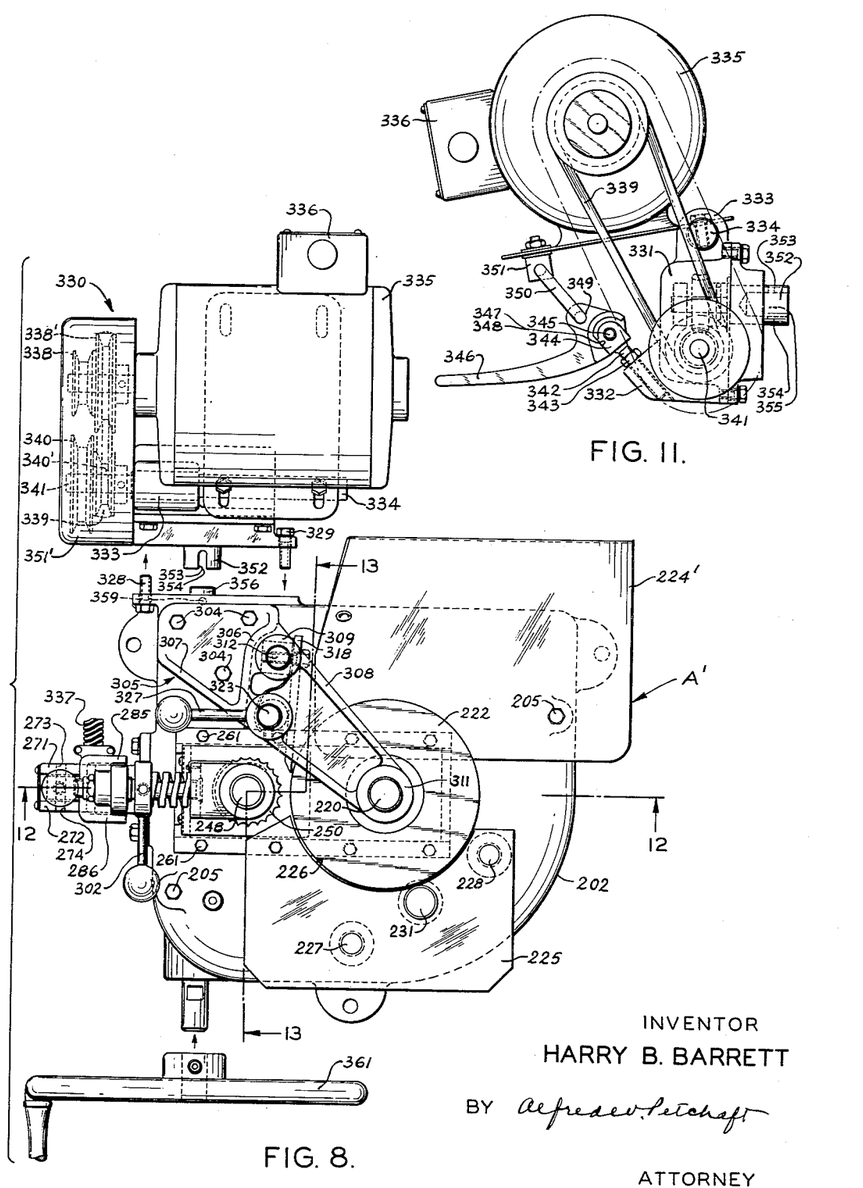
FIG. 8 is an exploded top plan view of a modified form of a brake shoe stripping machine constructed in accordance with and embodying the present invention.
FIG. 11 is a fragmentary side elevational view of the machine shown in FIG. 8 showing the motor mounting and belt tensioner.
Figure 9:
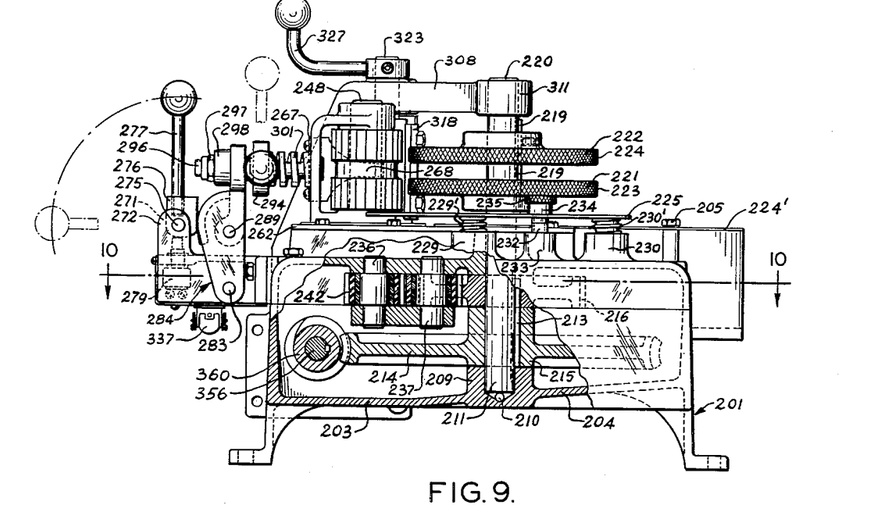
FIG. 9 is a fragmentary side elevational view of the machine shown in FIG. 8, partly broken away and in section.
Figure 10:
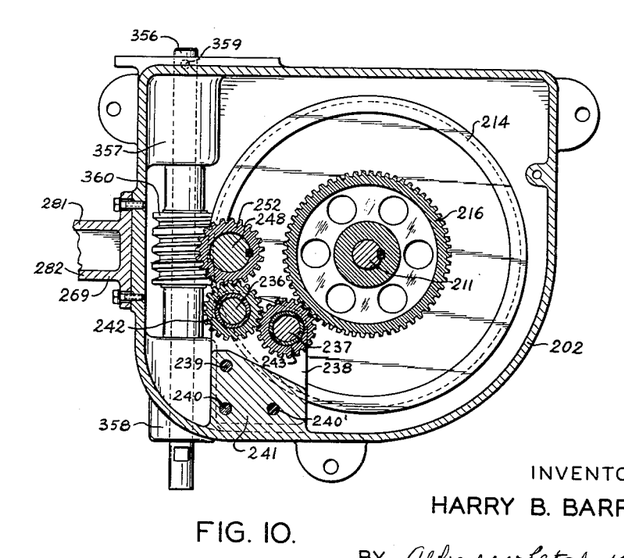
FIG. 10 is a fragmentary sectional view taken along line 10—10 of FIG. 9.
Figure 12:
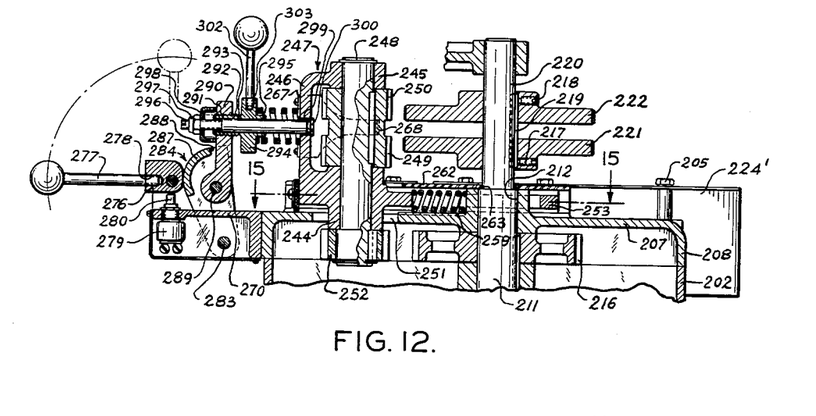
FIGS. 12 and 13 are fragmentary sectional views taken along lines 12—12 and 13—13, respectively, of FIG. 8.

Secured to the top wall 207 in downwardly spaced relation from the feed-wheel 221 is a brake shoe drop-off plate 224', and disposed between the top wall 207 and the feed wheel 221 and in spaced parallel relation to each is a thin, flat brake shoe supporting plate 225, similar to the brake shoe supporting plate 28, and provided with an arcuate edge 226, the radius of which is slightly greater than the radius of the feed-wheels 221, 222.

Rigidly secured to plate 225 and projecting downwardly therefrom is a pair of spaced parallel pins 227, 228, which extend through apertured upstanding bosses 229, 230, respectively, on the top wall 207. Encircling the pins 227, 228, are compression springs 229', 230', which bias the plate 225 upwardly with respect to the top wall 207. An adjusting screw 231 which passes through the plate 225 is provided with a threaded shank 232 adapted to engage a tapped hole in a boss 233 projecting upwardly from the top wall 207. At its upper end the screw 231 is integrally provided with an annular collar 234 for bearing against the upper face of the plate 225, and a knurled knob 235 to facilitate manipulation of the screw 231, whereby the vertical distance between the plate 225 and the feed-wheels 221, 222, may be adjusted.

Rotatably mounted at their upper ends in and projecting downwardly from the top wall 207 is a pair of spaced parallel idler shafts 236, 237, the lower ends of which are journaled in a retaining plate 238, rigidly secured by bolts 239, 240, 240', to a thickened portion 241 of the top wall 207. The idler shafts 236, 237, are provided with meshing idler spur gears 242, 243, respectively, gear 243 also meshing with the spur gear 216 on the shaft 211. Journaled within vertically spaced bearings 244, 245, formed integrally on and projecting laterally from the vertical web 246 of a slide casting 247 is a vertical spindle 248 to which is keyed an integrally formed pair of coarsely serrated feed-wheels 249, 250, which are located in peripheral alignment with the feed-wheels 221, 222. The lower end of the spindle 248 projects downwardly through an opening 251 in the top wall 207, and is provided with a spur gear 252 adapted to mesh with the idler gear 242. Also integrally formed on the casting 247 and projecting laterally outwardly from the bearing 244 is a plate 253 adapted for slidable disposition within opposed guide channels 254, 255, formed in the upper side of the top wall 207, and provided with an elongated aperture 256, the walls of which are loosely disposed about the bearing 212. Loosely disposed within a reduced portion 257 of the aperture 256 and having one end abutting the end wall 258 is a heavy compression spring 259, the other end of which abuts a flat vertical shoulder 260 formed on the bearing 212. Secured to the top wall 207 by bolts 261 in overlying relation to the plate 253 is a closure plate 262 provided with an aperture 263 through which the reduced upper end 220 of the shaft 211 extends. Secured to the slide casting 247 by bolts 264, 264', and backing plate 265, and extending between and contacting the guide channels 254, 255, is a felt lubricating pad 266, the lower end of which engages the top wall 207. Bolted or otherwise rigidly secured to the vertical web 246 of the casting 247 is a flat spring finger 267 having an outer reduced end portion 268 adapted to fit in the space between the feed-wheels 249, 250.

Bolted upon the side face of the annular skirt 268 and projecting laterally outwardly therefrom is a bracket 269 provided with a horizontal web 270, and on one end with a pair of spaced, parallel upwardly projecting ears 271, 272, having aligned apertures 273, 274, for journaling a stub shaft 275, upon which is rigidly secured a cam block 276 provided with an operating lever 277 threaded into a tapped hole 278. Rigidly secured to the horizontal web 270 between the ears 271, 272, is a switch 279 having a spring-biased contact plunger 280 adapted to be depressed by the cam block 276 when the operating lever 277 is moved from the position shown in full lines in FIG. 12 to the position shown in full lines in FIG. 9, all for purposes presently more fully appearing. Integrally formed on the bracket 269 and depending from the under side of the horizontal web 270 is a pair of spaced parallel flanges 281, 282, for journaling a pin 283 upon which is rigidly secured a follower arm 284 provided with a pair of spaced parallel side members 285, 286, and an arcuate web 287 provided with an end face 288, the outer surface of the arcuate web being adapted to contact the cam block 276. Endwise secured to and extending between the side members 285, 286, is a pin 289 for journaling a bracket plate 290 provided at its upper end with an internally threaded aperture 291 for rotatably receiving the threaded end 292 of a tubular sleeve 293 which extends horizontally inwardly toward the web 246, and on its inner end is provided with a diametrally enlarged collar 294 and an inwardly projecting short quill-like portion 295. Shiftably disposed in and extending axially through the sleeve 293 is a stud 296 having its outer threaded end provided with a nut 297 and a skirted collar 298 which bears against the outer face of the bracket plate 290. At its inner end the stud 296 extends somewhat loosely through a counterbored aperture 299 in the web 246 and is provided with a tapered head 300. Mounted loosely around the stud 296 in endwise abutment between the web 246 and collar 294 is a compression spring 301, somewhat heavier than the compression spring 259, which biases the casting 247 and the feed-wheels 249, 250, inwardly. An actuating lever 302 is threaded into a tapped radial hole 303 in the collar 294. It will be apparent that as the actuating lever 302 is moved so that the sleeve 293 moves toward the casting 247, the feed-wheels 249, 250, will be urged toward the feed-wheels 221, 222, with greater force, and will be opposed by the action of the compression spring 259. It will also be apparent that as the operating lever 277 is moved from the position shown in full lines in FIG. 12 to the position shown in full lines in FIG. 9, the cam block 276 will move the follower arm 284, and the end face 288 will bear against the outer face of the bracket plate 290 whereby to move the feed-wheels 249, 250, toward the feed-wheels 221, 222.

Figures 13, 14, 15:
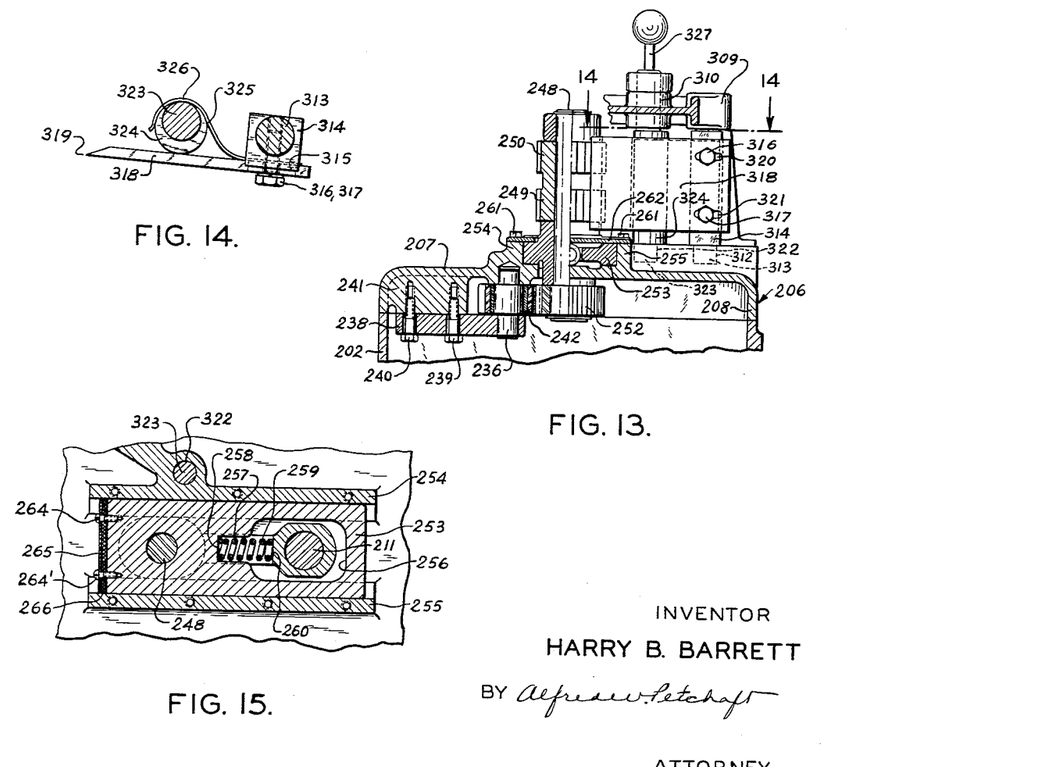
FIG. 14 is a fragmentary sectional view taken along line 14—14 of FIG. 13.
FIG. 15 is a fragmentary sectional view taken along line 15—15 of FIG. 12.

Rigidly secured to the top wall 207 by means of bolts 304 is a top casting 305 integrally including a vertical post 306, a reinforcing web 307, and an arm 308 having three vertical bearing bosses 309, 310, 311, the latter journaling the upper end 220 of the shaft 211. Journaled at its upper end in the bearing boss 309 and at its lower end in the bearing-forming aperture 312 in the top wall 207 is a knife-supporting spindle 313 integrally provided with a somewhat rectangler center portion 314, one face of which is undercut to form a recess 315. Rigidly secured to the spindle 313 in the recess 315 by means of bolts 316, 317, is a flat knife blade 318 provided with a cutting edge 319. As seen in FIG. 13, the bolts 316, 317, pass through elongated slots 320, 321, in one end of the knife blade 318. Journaled at its upper end in the bearing boss 310 and at its lower end in the bearing-forming apertures 322 in the top wall 207 is a shaft 323 provided with an eccentric cam portion 324 which is adapted to bear against and bias the knife blade 318 in the direction of the feed-wheels 221, 222. Secured at one end between the knife blade 318 and the knife-supporting spindle 313 and in flat facewise contact with each is a leaf spring 325 provided with an arcuate end portion 326 which partially encircles and contacts the eccentric cam portion 324 of the shaft 323. An operating lever 327 is rigidly secured to the upper end of the shaft 323, whereby said shaft 323 may be rotated against the action of the spring 325, and the cam portion 324 may move the cutting edge 319 in the direction of the feed-wheels 221, 222.

Secured to the side of the housing 201 by means of bolts 328, 329, is a motor speed reducer unit 330 including a speed reduction transmission 331 provided with a housing 332 having a trunnion 333 integrally formed thereon for swingably supporting a trunnion bar 334 to which is bolted a conventional electric motor 335. The electric motor 335 is controlled by an on-off switch and rheostat 336, and is also controlled by the switch 279, electrically connected to the motor by a cable 337. Rigidly secured on one end of the motor shaft is a pair of drive pulleys 338, 338', which transmit power through a "V" belt 339 to the pair of drive pulleys 340, 340', rigidly secured on one end of the power input shaft 341 of the speed reduction transmission 331. Threaded into the transmission housing 332 and extending upwardly and outwardly therefrom is a threaded stud 342 secured in position by a lock nut 343, and provided with an enlarged head 344. Pivotally secured by a pin 345 to the head 344 is a lever 346 having a flat face 347 adapted for facewise engagement with a flat face 348 on the head 344. Pivotally secured at its lower end to an ear 349 integrally formed on the lever 346 is a link 350, the upper end of which is swingable in a block 351, the latter being bolted to the motor 335. As seen by reference to FIG. 11, the link 350 is slightly offset to the left of the center of the stud 342. It will be apparent that as the lever 346 is moved upwardly so that the lower end of the link 350 moves to the right of the center line of the stud 343, the motor 335 will swing downwardly whereby the belt 339 can be removed or shifted from the pulleys 338, 340, to the pulleys 338', 340'. If desired, a belt guard 351' may be secured to the housing 332. Projecting forwardly from the housing 332 of the transmission 331 is a power output shaft 352 provided with axial slots 353, 354, and an axial bore 355 adapted to receive one end of a horizontal worm shaft 356 journaled in bearings 357, 358, integrally formed on the housing 201. A diametrally extending pin 359 (FIG. 10) is adapted to fit in the slots 353, 354, whereby the shaft 352 will drive the worm shaft 356, and rigidly secured to the worm shaft 356 between the bearings 357, 358, is a worm 360 adapted to drivingly mesh with the worm wheel 214. If desired, a hand wheel 361 may be removably secured to the other end of the worm shaft 356 so that the machine A' may be manually driven.

In using the modified form of the invention, the brake shoe is fed into the machine A' and the lining stripped therefrom in a manner similar to that shown in FIG. 4, whereupon the stripped shoe falls onto the drop-off plate 224'. Any lining material which may become lodged between the feed-wheels 249, 250, is removed by the spring finger 267. However, prior to starting the motor 335, the brake shoe is placed on the support plate 225 and the adjusting sleeve 293 is initially moved by the actuating lever 302 so that the serrations on the feed-wheels 249, 250, are just clear of the brake lining. The operating lever 277 is then moved from the position shown in full lines in FIG. 12 to the position shown in full lines in FIG. 9, whereby to force the feed-wheels 249, 250, into grip-forming engagement with the brake lining and simultaneously close the switch 279 which starts the motor 335. In this manner a plurality of shoes of the same size may be successively fed through the machine A' in a rapid manner without the necessity of initially resetting the machine A' each time a shoe is fed therethrough.

It should be understood that changes and modification in the form, construction, arrangement, and combination of the several parts of the machines for stripping lining from automotive brake shoes may be made and substituted for those herein shown and described without departing from the nature and principle of my invention.

Having thus described my invention, what I claim and desire to secure by Letters Patent is:

1. A brake shoe stripping machine comprising a base, bearing means mounted on the base, a supporting element rockably mounted on the bearing means and projecting radially therefrom, feed-wheel means operatively mounted on and carried by the supporting element in outwardly spaced relation to the bearing means, said feed-wheel means having a roughened peripheral surface for gripping the outwardly presented face of the lining of a brake shoe, a pair of spaced feed-wheels for gripping the interior face on opposite sides of the brake shoe flange, power means for rotating said feed-wheel means and pair of feed-wheels in opposite directions, compression spring means operatively mounted on the base and bearing against the supporting element for urging said feed-wheel means resiliently toward said pair of feed-wheels, means including a resilient element opposing said biasing means for simultaneously actuating said power means and urging said feed-wheel means into grip-forming engagement with the brake lining, means spaced from said pair of feed-wheels for supporting the edge of the brake shoe rim, means for adjusting the spacing between said last-mentioned means and the pair of spaced feed-wheels, a knife interposed in the path of said lining and having a cutting edge, spring means normally biasing said cutting edge away from the interface between the lining and rim, and cam means for positioning and holding the cutting edge at said interface whereby to strip the lining from said brake shoe as it is fed along a horizontal path.

2. A brake shoe stripping machine comprising a base housing having a horizontal wall, a vertical bearing post mounted on and projecting upwardly from said wall, a rocking member swingably mounted on and projecting radially outwardly from the post for rocking movement in a horizontal plane, a feed-wheel rotatably mounted on said member, a compression spring mounted on the base and bearing against said member for biasing said member into grip-forming engagement with the outwardly presented face of the brake lining, a first shaft rotatably mounted in said wall in spaced parallel relation to said feed-wheel, a pair of spaced feed-wheels mounted on said shaft and adapted to grip the interior face of the brake shoe rim, power-driven means for rotating said feed-wheel and said pair of spaced feed-wheels in opposite directions to feed said brake shoe along a horizontal arcuate path, a vertically adjustable horizontal plate having an upwardly presented flat surface parallel to said pair of spaced feed-wheels, said plate extending for a substantial distance around the periphery of said pair of spaced feed-wheels and having substantial area whereby to afford a flat table-like support for a brake shoe placed edgewise upon the upwardly presented surface thereof, said plate having a co-planar continuation portion which projects into the area beneath the feed-wheel and said pair of spaced feed-wheels so that the brake shoe may rest thereon as it passes between the feed-wheel and said pair of spaced feed-wheels and being adapted to support the edge of the brake shoe rim, a plurality of pins mounted on said plate and slidably projecting into said wall, means for varying the distance between said plate and wall, a knife-supporting spindle journaled in said wall, a knife secured to said spindle and being provided with a cutting edge, and a second shaft journaled in said wall and provided with a cam portion adapted to bias the knife in a plurality of positions in the direction of the pair of spaced feed-wheels, whereby said cutting edge is adjustably positioned at the interface of the lining and rim as said lining is stripped from the brake shoe.

3. A brake shoe stripping machine comprising a base housing having a horizontal wall, a vertical bearing post mounted on and projecting upwardly from said wall, a rocking member swingably mounted on and projecting radially outwardly from the post for rocking movement in a horizontal plane, a feed-wheel rotatably mounted on said casting and adapted to grip the outwardly presented face of the brake lining, a compression spring mounted on the base and bearing against said member for sliding said member along said wall, a first shaft rotatably mounted in said wall in spaced parallel relation to said feed-wheel, a pair of spaced feed-wheels mounted on said shaft and adapted to grip the interior face of the brake shoe rim, power-driven means for rotating said feed-wheel and said pair of spaced feed-wheels in opposite directions to feed said brake shoe along a horizontal arcuate path, a vertically adjustable horizontal plate having an upwardly presented flat surface parallel to said pair of spaced feed-wheels, said plate extending for a substantial distance around the periphery of said pair of spaced feed-wheels and having substantial area whereby to afford a flat table-like support for a brake shoe placed edgewise upon the upwardly presented surface thereof, said plate having a co-planar continuation portion which projects into the area beneath the feed-wheel and said pair of spaced feed-wheels so that the brake shoe may rest thereon as it passes between the feed-wheel and said pair of spaced feed-wheels and being adapted to support the edge of the brake shoe rim, pin means connected to said plate and being slidably mounted in said wall, means threaded into said wall for varying the distance between said plate and wall, a knife-supporting spindle journaled in said wall, a knife secured to said spindle and being provided with a cutting edge, a second shaft journaled in said wall and provided with a cam portion adapted to bias the knife in a plurality of positions in the direction of the pair of spaced feed-wheels, whereby said cutting edge is adjustably positioned at the interface of the lining and rim as said lining is stripped from the brake shoe, an auxiliary spring means operatively associated with said second shaft and knife-supporting spindle for urging said knife away from said pair of spaced feed-wheels.

4. A brake shoe stripping machine comprising a base housing having a horizontal wall, a vertical bearing post mounted on and projecting upwardly from said wall, a rocking member swingably mounted on and projecting radially outwardly from the post for rocking movement in a horizontal plane, a feed-wheel having a roughened outer periphery rotatably mounted on said casting and adapted to grip the outwardly presented face of the brake lining, a compression spring mounted on the base and bearing against said member for sliding said casting along said wall, a top casting rigidly secured to said wall, a first shaft journaled in said wall and said top casting in spaced parallel relation to said feed-wheel, a pair of spaced feed-wheels having roughened outer peripheries mounted on said first half and adapted to grip the interior face of the brake shoe rim, power-driven means for rotating said feed-wheel and said pair of spaced feed-wheels in opposite directions to feed said brake shoe along a horizontal arcuate path, a plate operatively associated with said wall, a vertically adjustable horizontal plate having an upwardly presented flat surface parallel to said pair of spaced feed-wheels, said plate extending for a substantial distance around the periphery of said pair of spaced feed-wheels and having substantial area whereby to afford a flat table-like support for a brake shoe placed edgewise upon the upwardly presented surface thereof, said plate having a co-planar continuation portion which projects into the area beneath the feed-wheel and said pair of spaced feed-wheels so that the brake shoe may rest thereon as it passes between the feed-wheel and said pair of spaced feed-wheels and being adapted to support the edge of the brake shoe rim, means for adjusting the spacing between said plate and said pair of feed-wheels, a knife-supporting spindle journaled in the top casting and the wall, a knife secured to said spindle and being provided with a cutting edge, a second shaft journaled in the top casting and the wall and provided with a cam portion adapted to bias the knife in a plurality of positions in the direction of the pair of spaced feed-wheels, whereby said cutting edge is positioned at the interface of the lining and rim as said lining is stripped from the brake shoe, and a spring rod operatively associated with said second shaft and said knife-supporting spindle for urging said knife away from said pair of wheels.

5. In a brake shoe stripping machine consisting of first feed-wheel means for gripping the outwardly presented face of the lining of the brake shoe, second feed-wheel means for gripping the interior face of the brake shoe rim, power means for driving said first and second feed-wheel means in opposite directions, whereby to feed said brake shoe along a predetermined path, and cutter means adapted for disposition along a line coincident with the inner face between the lining and rim for stripping the lining from the rim as it is fed along said path, means for simultaneously actuating said power means and urging said first feed-wheel means into grip-forming engagement with the brake lining, said means comprising a first spring means for normally biasing said first and second feed-wheel means in opposite directions, a second spring means opposing said first spring means, manually adjustable cam means attached to said second spring means to place said second spring means under a selected amount of compression upon insertion of a brake shoe between first feed-wheel means and second feed-wheel means, said second spring means will be compressed whereby said first feed-wheel means will be urged into grip-forming engagement with said brake shoe; and an electrical switch operatively associated with said cam means whereby the placing of the cam in the operative position closes the electrical contacts of the switch actuating said power means for driving the brake shoe through said cutter.

References Cited in the file of this patent

UNITED STATES PATENTS

| | | |
|---|---|---|
| 670,389 | Hull | Mar. 19, 1901 |
| 1,035,154 | Clark | Aug. 13, 1912 |
| 1,652,715 | Hanscom | Dec. 13, 1927 |
| 1,821,899 | Schneider | Sept. 1, 1931 |
| 2,346,194 | Sjostrom | Apr. 11, 1944 |
| 2,655,372 | Hempel | Oct. 13, 1953 |
| 2,780,284 | Wisti | Feb. 5, 1957 |